(12) United States Patent
Joo

(10) Patent No.: US 9,392,399 B2
(45) Date of Patent: *Jul. 12, 2016

(54) WIRELESS TERMINAL AND METHOD OF DATA COMMUNICATION THEREIN

(71) Applicant: Samsung Electronics Co., Ltd., Gyeonggi-do (KR)

(72) Inventor: Sun Woong Joo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,735

(22) Filed: Feb. 24, 2015

(65) Prior Publication Data

US 2015/0172852 A1 Jun. 18, 2015

Related U.S. Application Data

(63) Continuation of application No. 13/923,675, filed on Jun. 21, 2013, now abandoned, which is a continuation of application No. 12/836,623, filed on Jul. 15, 2010, now Pat. No. 8,472,472.

(30) Foreign Application Priority Data

Jul. 23, 2009 (KR) .......................... 10-2009-0067116

(51) Int. Cl.
*H04W 4/00* (2009.01)
*H04W 40/20* (2009.01)
*H04M 1/725* (2006.01)
*H04W 40/12* (2009.01)

(52) U.S. Cl.
CPC .......... *H04W 4/008* (2013.01); *H04M 1/72569* (2013.01); *H04W 40/20* (2013.01); *H04W 40/12* (2013.01)

(58) Field of Classification Search
None
See application file for complete search history.

(56) References Cited

U.S. PATENT DOCUMENTS

| | | | | |
|---|---|---|---|---|
| 4,222,076 | A * | 9/1980 | Knowlton | H04N 1/41 358/426.02 |
| 6,396,518 | B1 * | 5/2002 | Dow | H01H 85/042 400/88 |
| 6,639,687 | B1 * | 10/2003 | Neilsen | G06F 11/0715 358/1.1 |
| 7,158,266 | B2 * | 1/2007 | Kameyama | H04N 1/00204 358/1.15 |
| 2007/0036170 | A1 | 2/2007 | Gonikberg et al. | |
| 2008/0195735 | A1 * | 8/2008 | Hodges | G06F 1/626 709/227 |
| 2009/0005061 | A1 | 1/2009 | Ward et al. | |
| 2009/0227282 | A1 | 9/2009 | Miyabayashi et al. | |
| 2009/0244015 | A1 | 10/2009 | Sengupta et al. | |
| 2009/0262661 | A1 | 10/2009 | Ueda et al. | |
| 2010/0138797 | A1 | 6/2010 | Thorn | |
| 2010/0197271 | A1 | 8/2010 | Yoshikawa et al. | |
| 2010/0277363 | A1 | 11/2010 | Kainulainen et al. | |

FOREIGN PATENT DOCUMENTS

KR 10-2008-0058873 A 6/2008

* cited by examiner

*Primary Examiner* — Eunsook Choi
(74) *Attorney, Agent, or Firm* — Cha & Reiter, LLC

(57) ABSTRACT

A wireless terminal and a method of data communication between such wireless terminals includes a first wireless terminal determining whether a second wireless terminal is located within a preset distance, the first wireless terminal determining whether the first wireless terminal is tilted at more than a preset slope and the first wireless terminal transmitting a preset packet of data to the second wireless terminal where it determines that the second wireless terminal is located within the preset distance from the first wireless terminal and the first wireless terminal is tilted at more than the preset slope.

20 Claims, 14 Drawing Sheets

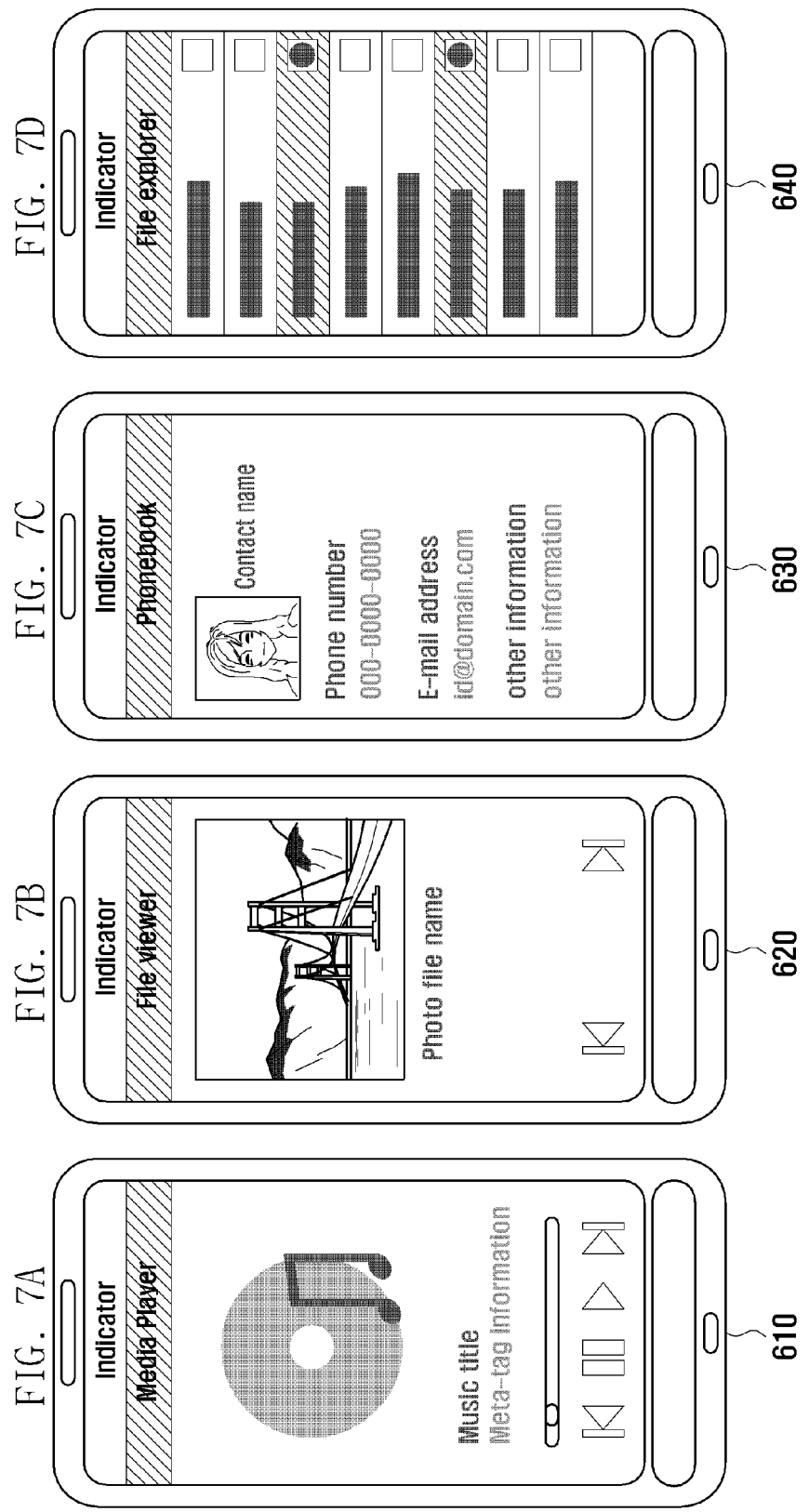

WIRELESS TERMINAL AND METHOD OF DATA COMMUNICATION THEREIN

CROSS REFERENCE TO RELATED APPLICATIONS

The present application is a Continuation of U.S. patent application Ser. No. 13/923,675 filed on Jun. 21, 2013, which is a Continuation of an earlier U.S. patent application Ser. No. 12/836,623 filed on Jul. 15, 2010, and assigned U.S. Pat. No. 8,472,472 issued on Jun. 25, 2013 which claims the benefit of priority under 35 U.S.C. §119 (a) of an application entitled "Wireless Terminal and Method of Data Communication Therein" filed in the Korean Intellectual Property Office on Jul. 23, 2009 and assigned Ser. No. 10-2009-0067116, the contents of which are hereby incorporated by reference in its entirety.

BACKGROUND

1. Field of the Invention

The present invention broadly relates wireless terminals and methods of data communication therebetween. The present invention relates more particularly to a wireless terminals with a capability of controlling communication between other wireless terminals and a method of data communication implemented therein.

2. Description of the Related Art

Nowadays, known wireless terminals may support communication with other wireless terminals through a short range communication method that relies on Bluetooth or infrared communication means. In more detail, known wireless terminals have an ability to copy or move content such as a file contained in the wireless terminal to another wireless terminal through a wireless communication, and similarly receive content from the other wireless terminal. The wireless terminals thereby send and receive data necessary for other applications.

In order to perform copying of content using such a conventional short range communication method, the user first inputs a command (for example, by selecting the command from a menu) for controlling the wireless terminal to enter a communication mode to communicate between other wireless terminals by the short range communication method. The wireless terminal then identifies and displays a list of other wireless terminals that may communicate therewith by searching in range surroundings in response to the user's command. The user then inputs another command to select one wireless terminal from the list of in range or available terminal with which it may communicate. Finally, the user inputs another command to select content (for example, a file) to be copied and execute a copy operation to move or copy the file content.

Such known communication method and operations are complicated and cumbersome, and may be quite inconvenient for the user to execute. Additionally, the known method and operations are not intuitive and the user may experience difficulty therewith.

SUMMARY

The present invention has been made in view of the above problems, and enables a user to conveniently control content copying, content movement and other related operations between wireless terminals.

Additionally, the present invention enables the user to intuitively control the content copying, content movement and other related operations between wireless terminals.

Further, the present invention enables the user to experience an enjoyable feeling in controlling the content copying, content movement and other related operations between wireless terminals.

In an aspect of the invention, a method of data communication between wireless terminals is operable in a processor comprising a first wireless terminal The method includes determining by the first wireless terminal whether a second wireless terminal is located within a preset distance, determining by the first wireless terminal whether the first wireless terminal is tilted more than a preset slope and transmitting a preset packet to the second wireless terminal by the first wireless terminal if the first wireless terminal determines that the second wireless terminal is located within the preset distance from the first wireless terminal and the first wireless terminal is tilted at more than the preset slope.

In another aspect of the invention, a wireless terminal includes an approach detection unit for determining whether a reception wireless terminal is located within a preset distance from the wireless terminal, a tilt detection unit for determining whether the wireless terminal is tilted at more than a preset slope and a communication unit for transmitting a preset packet to the reception wireless terminal if the approach detection unit determines that the reception wireless terminal is located within the preset distance from the wireless terminal and the tilt detection unit determines that the wireless terminal is tilted at more than the preset slope.

BRIEF DESCRIPTION OF THE DRAWINGS

The above features and advantages of the present invention will be more apparent from the following detailed description when read in conjunction with the accompanying drawings, in which:

FIG. 7A, FIG. 7B, FIG. 7C and FIG. 7D illustrate examples of wireless terminals according to the present invention.

DETAILED DESCRIPTION

Figure 1A:
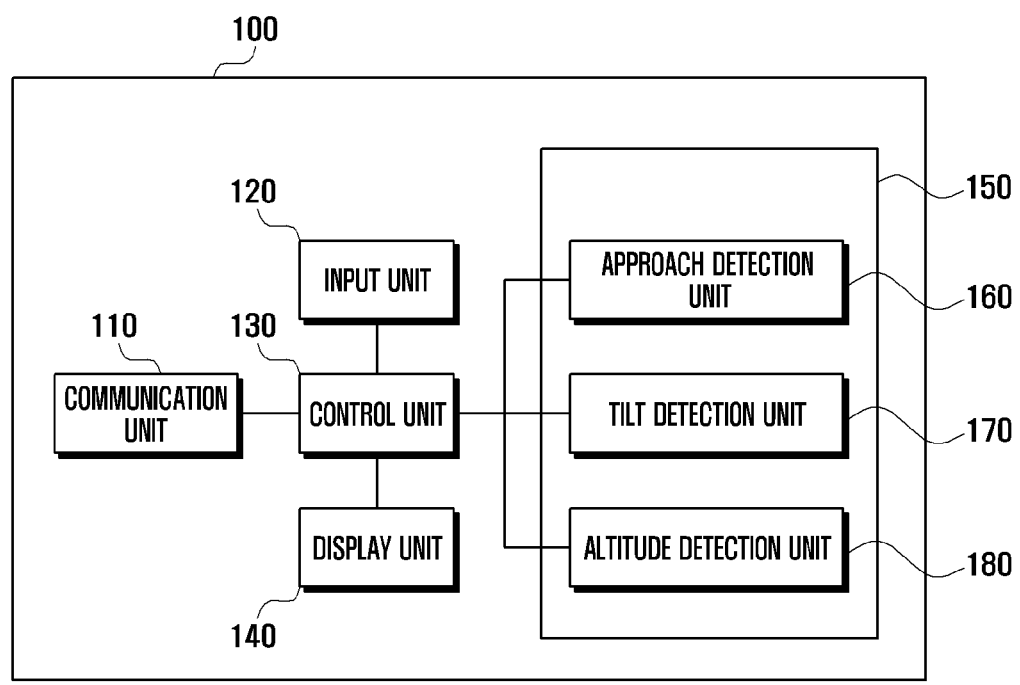
FIG. 1A is a block diagram of one embodiment of a wireless terminal of the invention.

Hereinafter, exemplary embodiments of the present invention are described in detail with reference to the accompanying drawings.

The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present invention.

The terms content, data, data content, packet, data packet, packet of data, packet data, packet data content and packet data content are used interchangeably herein to describe data in any form that may be copied or moved for transfer or communication between first and second terminals in accordance with the inventive concepts, irrespective of any data packetization scheme or standard.

Figure 1B:
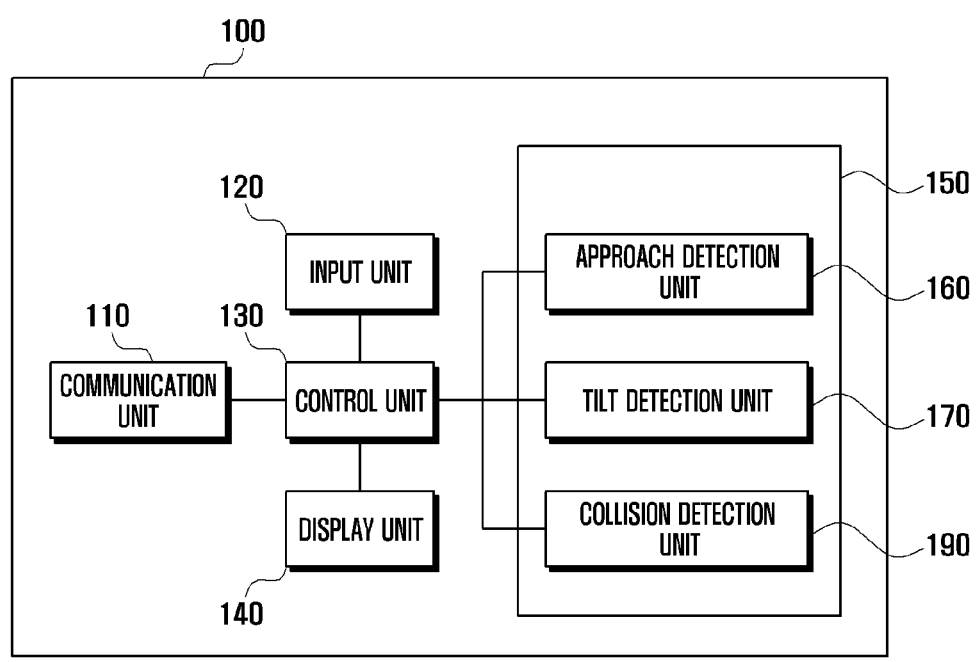
FIG. 1B is a block diagram of another embodiment of a first wireless terminal of the invention.

FIG. 1A is a block diagram of one embodiment of a wireless terminal of the invention; FIG. 1B is a block diagram of another wireless terminal of the invention and FIG. 2 illustrates one embodiment of an operation by which a first wireless terminal (transmitting terminal) move content to a second wireless terminal (receiving terminal).

Referring to FIG. 1A, a first wireless terminal 100 includes a communication unit 110, an input unit 120, a control unit 130, a display unit 140 and a detection unit 150. The detection unit 150 includes an approach detection unit 160, a tilt detection unit 170 and an altitude detection unit 180.

Figure 2:
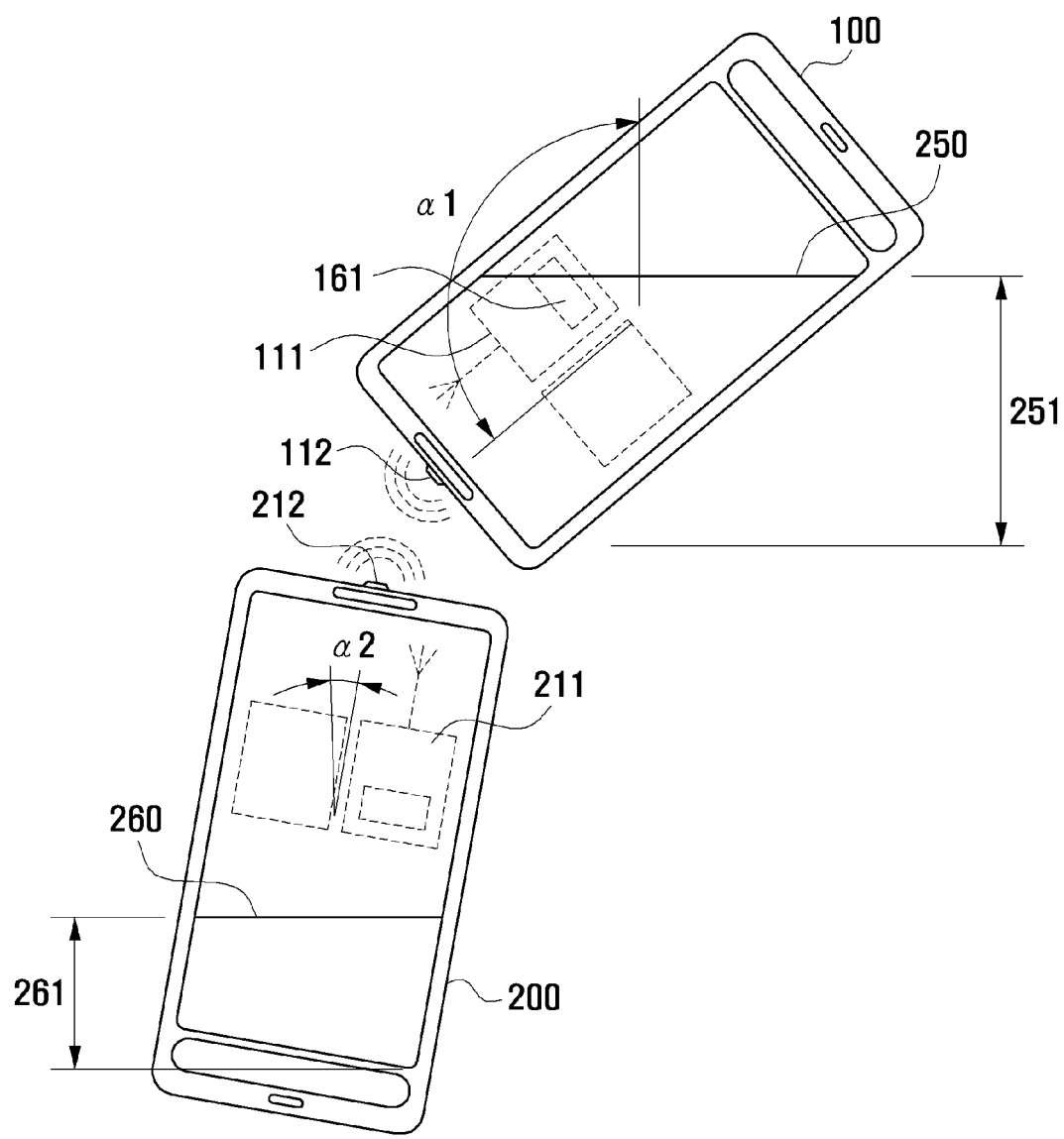
FIG. 2 illustrates one embodiment of an operation for moving content from a first wireless terminal (transmitting terminal) to a second wireless terminal (receiving terminal) according to the invention.

When a user wants to transmit a predetermined packet (for example, content) from the first wireless terminal 100 to a second wireless terminal 200, the user transmits the packet by moving one of the two wireless terminals 100 and 200 towards the other, as shown in FIG. 2, as distinguished from the operations required to do so in accordance with the conventional method and operations described in detail above.

In order to transmit (i.e., move the content in the predetermined packet form, the detection unit 150 determines whether a transmission start condition is satisfied. Then, the approach detection unit 160 determines whether the second wireless terminal 200 is located within a preset distance from the first wireless terminal 100, i.e., in range. For example, the approach detection unit 160 is embodied by a signal intensity measuring unit 161 that measures intensity of a radio signal generated by a wireless communication module of the second wireless terminal 200, for example, a Bluetooth module 211. Other methods are described later referring to FIGS. 3 to 4C.

The tilt detection unit 170 then determines whether the first wireless terminal 100 is tilted at more than a preset slope. Here, the slope represents an angle of a slope of a wireless terminal with regard to the reference state of a wireless terminal. Generally, the reference state is a state in which letters shown in a display screen are in a normal upright orientation). For example, the slope of the first wireless terminal 100 in FIG. 2 is α 1.

The altitude detection unit 180 then determines whether the altitude of the first wireless terminal 100 is higher than that of the second wireless terminal 200.

Referring to FIG. 1B, an alternative embodiment of the first wireless terminal 100 is shown wherein the detection unit 150 includes a collision detection unit 190 in place of the altitude detection unit 180 included in the FIG. 1A embodiment.

The collision detection unit 190 determines whether collision occurs between the first wireless terminal 100 and second wireless terminal 200. Collision is determined by, for example, an acceleration sensor or a pressure sensor. When an acceleration sensor is used, collision is determined to occur if an instantaneous acceleration is detected that is greater than a preset acceleration value. When a pressure sensor is installed on a surface of the first wireless terminal 100, collision is determined to occur if a pressure above a preset pressure value of the sensor is detected. For that matter, collision is determined by other known methods for detecting a collision between the first and the second wireless terminals without deviating from the scope and spirit of the invention.

Detection information determined by the approach detection unit 160, the tilt detection unit 170 and the altitude detection unit 180 or the collision detection unit 190 is transmitted to the control unit 130.

Detailed operations and configurations of the approach detection unit 160, the tilt detection unit 170, the altitude detection unit 180 and the collision detection unit 190 are described later referring to FIGS. 4A to 4C.

In one embodiment, if the approach detection unit 160 determines that the second wireless terminal 200 is located within a preset or in-range distance from the first wireless terminal 100, the tilt detection unit 170 determines that the first wireless terminal 100 is tilted at more than a preset slope and the altitude detection unit 180 determines that the altitude of the first wireless terminal 100 is higher than that of the second wireless terminal 200, the control unit 130 receives the detection information and controls the communication unit 110 to transmit a predetermined packet to the second wireless terminal 200.

In an alternative embodiment, the detection unit 150 does not include the altitude detection unit 180 or collision detection unit 190. Said embodiment operates whereby if the approach detection unit 160 determines that the second wireless terminal 200 is located within a predetermined distance from the first wireless terminal 100 (i.e., in range), and the tilt detection unit 170 determines that the first wireless terminal 100 is tilted at more than a preset slope, the control unit 130 receives detection information and controls the communication unit 110 to transmit a predetermined packet to the second wireless terminal 200. That is, said embodiment operates to effect transmission without detection information of an altitude detection unit or collision detection unit.

The communication unit 110 communicates with the second wireless terminal 200, other terminals, or a base station according to control of the control unit 130. That is, the communication unit 110 transmits a predetermined packet to the second wireless terminal 200 according to control of the control unit 130 when the detection unit 150 determines that a transmission start condition is satisfied. A predetermined packet is a data packet corresponding to content selected by a user through the input unit 120, or is a data packet corresponding to content displayed on the display unit 140.

The communication unit 110 comprises at least one of a Bluetooth module 111, an infrared communication device 112(IrDA), a WI-FI module, a TransferJet module and other wireless communication module, without limitation, the detailed operation and configuration of which will be described below with reference to FIG. 3.

The input unit 120 receives input of a command to select content from the user. A data packet corresponding to content selected by the user is transmitted to the second wireless terminal 200 through the communication unit 110, the detailed operation and configuration of which will be described below with reference to FIG. 3.

The display unit 140 provides an interface screen for inputting a command to select content. Additionally, the display unit 140 displays a progress state of transmission of a data packet. The display unit 140 represents a packet by displaying a corresponding amount of a material image and displaying a decreasing amount of the material image as transmission of the packet proceeds, i.e., as a transmitted amount of the packet increases. Here, the material image is embodied as a form of liquid (water, etc), powder, or small pieces.

As shown in FIG. 2, a height 251 of a material or liquid surface image 250 displayed on the first wireless terminal 100 decreases as transmission of the data packet proceeds. Conversely, a height 261 of a material or liquid surface image 260 displayed on the second wireless terminal 200 increases as transmission of the data packet proceeds.

Figure 3:
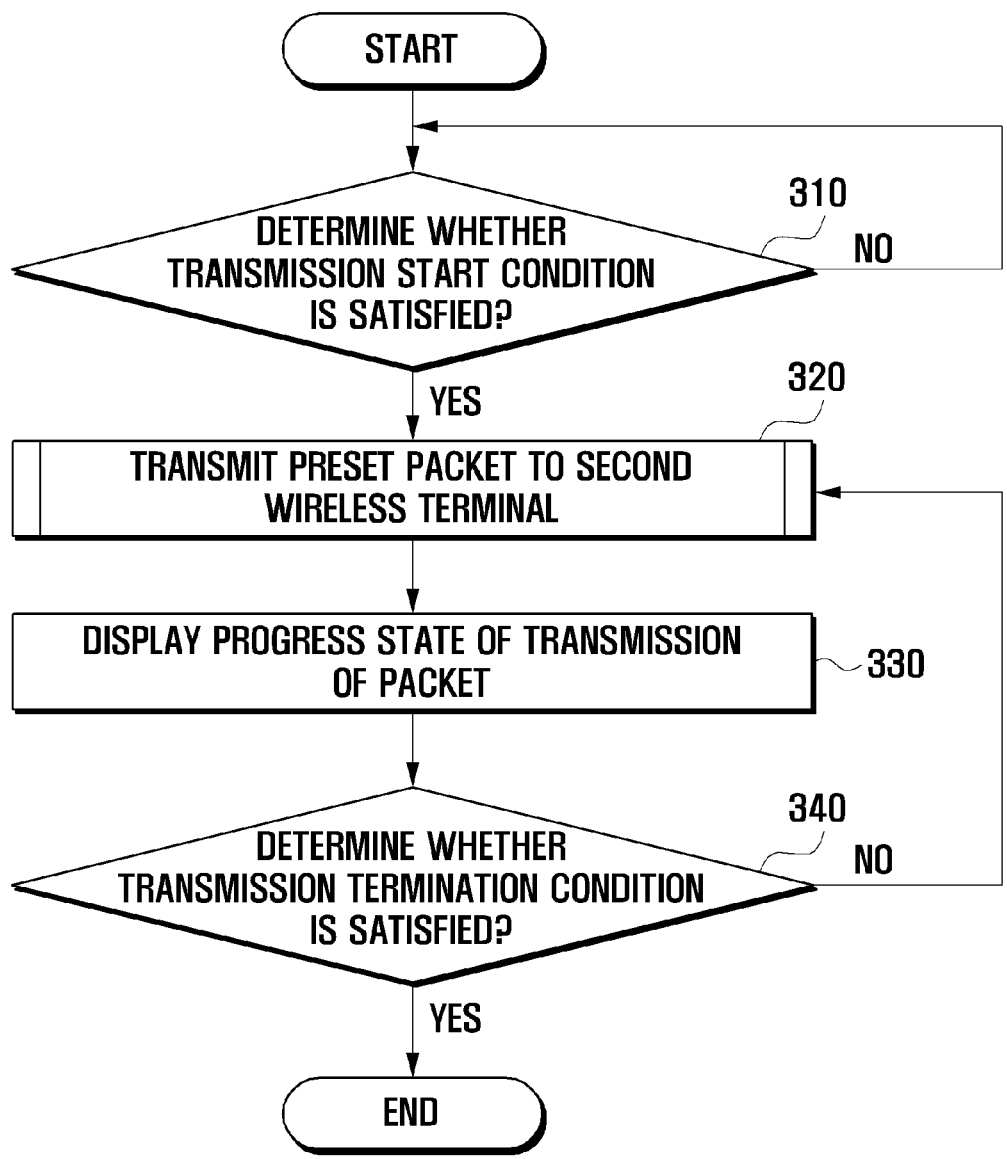
FIG. 3 is a flow chart illustrating one embodiment of a method of data communication according to the invention.

FIG. 3 is a flow chart illustrating a method of data communication according to the invention performed by the first wireless terminal 100.

Firstly, the detection unit 150 determines whether a transmission start condition is satisfied (step 310).

Figure 4A:
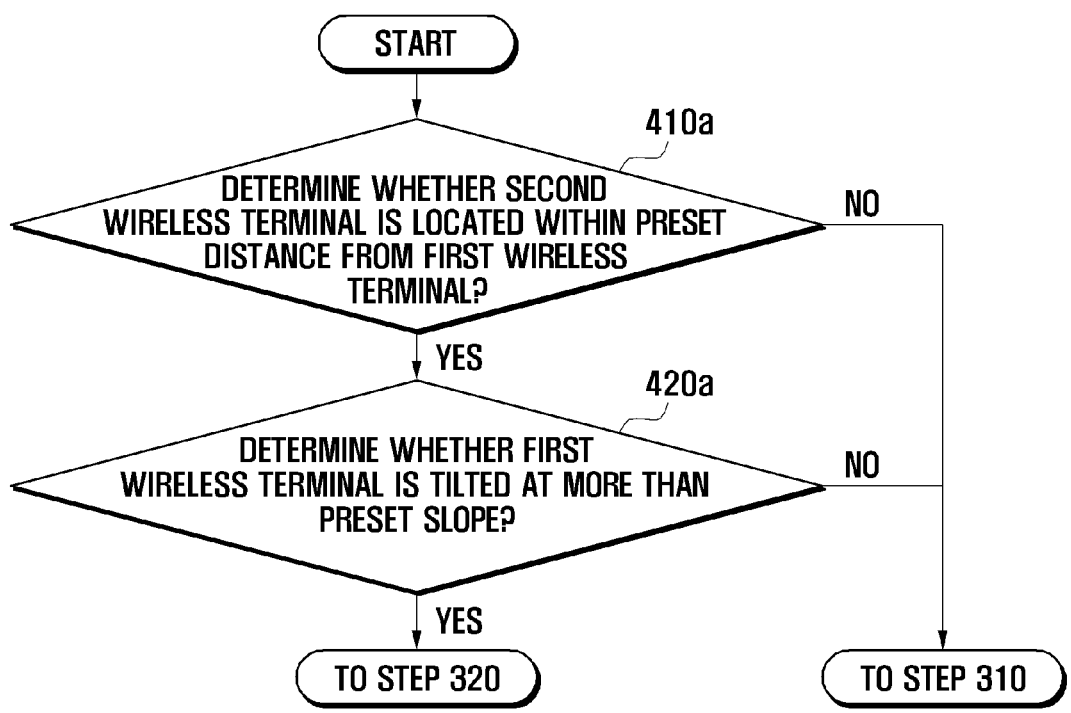
FIG. 4A is a detailed flow chart illustrating a step of determining whether a transmission start condition is satisfied in the method of FIG. 3.

FIG. 4A is a detailed flow chart illustrating step 310 of FIG. 3 for a case in which the detection unit 150 includes the approach detection unit 160 and tilt detection unit 170, but does not include the altitude detection unit 180 and collision detection unit 190. That is, the FIG. 4A embodiment does not utilize the altitude detection unit 180 or collision detection unit 190 if included in the detection unit 150.

After determining the start condition, the approach detection unit 160 determines whether the second wireless terminal 200 is located within a preset distance from the first wireless terminal 100 (step 410a), i.e., is in-range.

For example, the approach detection unit 160 is embodied by the signal intensity measuring module 161 that measures intensity of a radio signal. It is assumed that the second wireless terminal 200 periodically generates a location notifying signal of a given intensity (based on a generation location) according to a Bluetooth or Wi-Fi method. A location notifying signal is a radio signal of a predetermined intensity generated by the second wireless terminal 200 with reference to a signal generating location in order to notify existence of the second wireless terminal 200 to other wireless terminals. The approach detection unit 160 of the first wireless terminal 100 measures the intensity of the received location notifying signal generated by the second wireless terminal 200. Because the intensity of the signal becomes weaker as the distance from the signal generating location increases, the distance between the first wireless terminal 100 and second wireless terminal 200 is determined based on the intensity of the received location notifying signal.

Figure 5A:
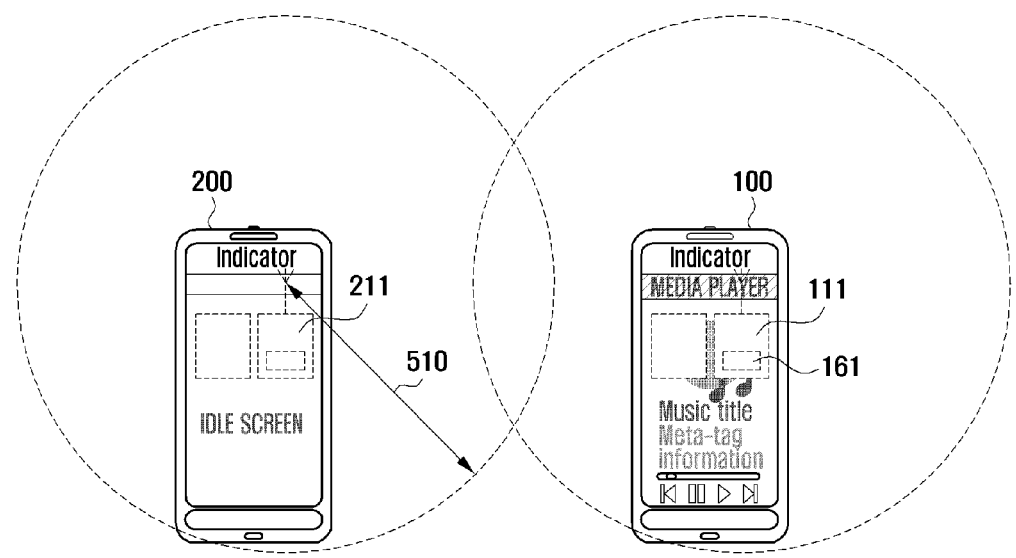
FIG. 5A and FIG. 5B illustrate processes of determining approach according to the invention.
Figure 5B:
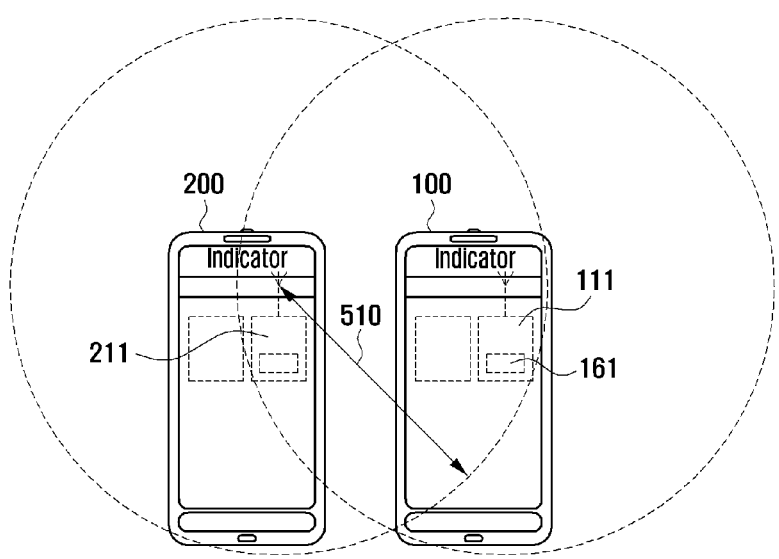

FIGS. 5A and 5B illustrate processes of determining approach according to an embodiment of the invention.

In FIGS. 5A and 5B, a Bluetooth module 211 of the second wireless terminal 200 generates a location notifying signal. The signal intensity measuring module 161 of the first wireless terminal 100 measures the intensity of the received location notifying signal. In FIGS. 5A and 5B, a reference distance 510 is a base distance set such that, if the first and second wireless terminals 100 and 200 approach within the reference distance 510, the process of step 420a proceeds to step 420a. Here, reference signal intensity is a signal intensity preset by the user or a terminal manufacturer as an intensity of a signal expected to be measured by the signal intensity measuring module 161 when the first and second wireless terminals 100 and 200 are separated by the reference distance 510. The intensity of the location notifying signal generated by the Bluetooth module 211 is measured by the signal intensity measuring module 161.

In FIG. 5A, the distance between the first and second wireless terminals 100 and 200, specifically, the distance between the Bluetooth module 211 and signal intensity measuring module 161, is greater than the reference distance 510. Accordingly the intensity of the location notifying signal measured by the signal intensity measuring module 161 is less than the reference intensity. Where the intensity of the location notifying signal measured by the signal intensity measuring module 161 is less than the reference intensity, the distance between the first and second wireless terminals 100 and 200 is determined to be greater than the reference distance 510 and the process of step 410a accordingly returns to step 310, i.e., the terminals are not in-range.

In contrast, in FIG. 5B, the distance between the first and second wireless terminals 100 and 200, specifically, the distance between the Bluetooth module 211 and signal intensity measuring module 161, is less than the reference distance 510. Accordingly, the intensity of the location notifying signal measured by the signal intensity measuring module 161 is greater than the reference intensity. As the intensity of the location notifying signal measured by the signal intensity measuring module 161 is greater than the reference intensity, the distance between the first and second wireless terminals 100 and 200 is determined to be less than the reference distance 510 and the process of step 410a accordingly proceeds to step 420a, the terminals are in-range.

In another embodiment, the second wireless terminal 200 generates a location notifying signal having an intensity sufficiently weak such that only a wireless terminal within a preset distance may detect the signal. In said embodiment, the approach detection unit 160 determines that the first and second wireless terminals 100 and 200 are located within the preset distance when the location notifying signal of the second wireless terminal 200 is detected.

The TransferJet method requires that two wireless terminals approach within about 3 cm of each other in order to communicate. In FIGS. 5A and 5B, it is assumed that the second wireless terminal 200 generates a location notifying signal corresponding to the TransferJet method, and generates the location notifying signal at an intensity that is detected within the reference distance 510 from the second wireless terminal 200. In this case and as depicted in FIG. 5A, because the first wireless terminal 100 cannot detect the location notifying signal of the second wireless terminal 200, the distance between the first and second wireless terminals 100 and 200 is greater than the reference distance 510 and the process of step 410a accordingly returns to step 310, i.e., they are out of range. Additionally, and as shown in FIG. 5B, because the first wireless terminal 100 detects the location notifying signal of the second wireless terminal 200, the distance between the first and second wireless terminals 100 and 200 is determined to be less than the reference distance 510, and the process of step 410a accordingly proceeds to step 420a.

In another embodiment, the approach detection unit 160 determines whether the first and second wireless terminals 100 and 200 are located within a preset distance by an optical sensor. By the above methods at step 410a, if the first wireless terminal 100 detects an approach of the second wireless terminal 200 to within a preset distance, the process of step 410a proceeds to step 420a. If the first wireless terminal 100 does not detect the approach of the second wireless terminal 200 to within the preset distance, the process of step 410a returns to step 310 to repeat the process of determining whether a transmission start condition is satisfied.

The tilt detection unit 170 determines whether the first wireless terminal 100 is tilted at more than the preset slope (step 420*a*). In FIG. 2, the first wireless terminal 100 is tilted at a slope of α 1. If, for example, the preset slope is 90 degrees and α 1 is 120 degrees, the tilt detection unit 170 determines that the first wireless terminal 100 is tilted at more than the preset slope and the process of step 420*a* accordingly proceeds to step 320 to start transmission of a data packet. If the tilt detection unit 170 determines that the first wireless terminal 100 is not tilted at more than the preset slope in step 420*a*, the process of step 420*a* accordingly returns to step 310 to repeat the process of determining whether a transmission start condition is satisfied. A method of determining a slope is a known technology and detailed description thereof is omitted.

According to the above methods, if the first wireless terminal 100 determines that the second wireless terminal 200 is located within the reference distance 510 and that the first wireless terminal 100 is tilted at more than the preset slope, the first wireless terminal 100 starts transmission of a data packet. Referring to FIG. 2, packet transmission is started by the user manipulating in a similar manner to pouring a liquid such as water from the first wireless terminal 100 to the second wireless terminal 200.

The second wireless terminal 200 receives the packet from the first wireless terminal 100 and performs a preset operation. For example, the second wireless terminal 200 receives the packet from the first wireless terminal 100 and stores the data packet or packets in a storage unit, including without limitation media files, picture files and address list files.

Figure 4B:
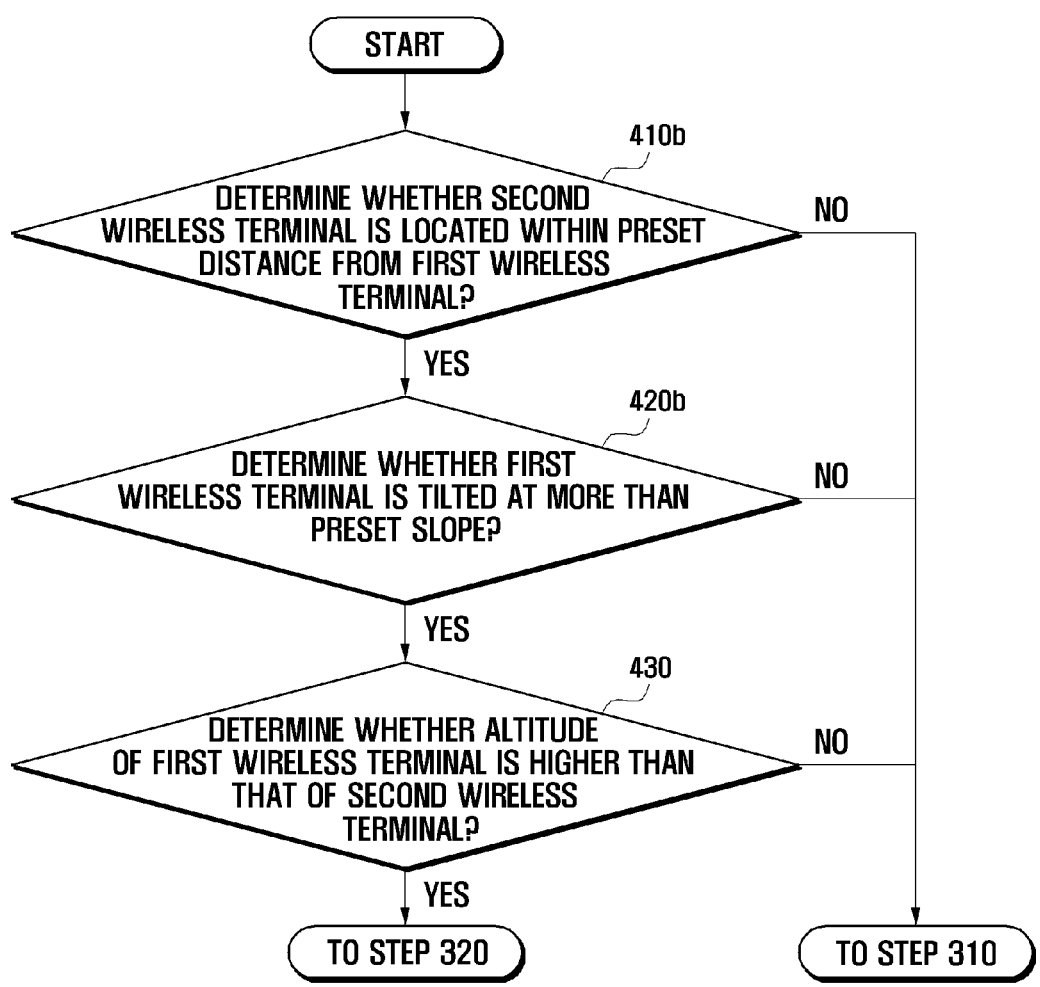
FIG. 4B is a detailed flow chart illustrating a step of determining whether a transmission start condition is satisfied in the method of FIG. 3.

FIG. 4B is a detailed flow chart illustrating step 310 of FIG. 3 in a case wherein the detection unit 150 includes the approach detection unit 160, the tilt detection unit 170 and the altitude detection unit 180. In the FIG. 4B flow chart, however, the detection unit 150 does not include the collision detection unit 190 or does not utilize the collision detection unit 190 if included in the detection unit 150.

Steps 410*b* and 420*b* of FIG. 4B correspond to steps 410*a* and 420*a* of FIG. 4A, respectively. In FIG. 4B, if the first wireless terminal 100 determines that the second wireless terminal 200 is located within a preset distance from the first wireless terminal 100 (step 410*b*) and the first wireless terminal 100 is tilted at more than a preset slope (step 420*b*), the process of step 420*b* proceeds to step 430, instead of proceeding to step 320 to start transmission of a packet as in FIG. 4A.

The altitude detection unit 180 determines whether the altitude of the first wireless terminal 100 is higher than that of the second wireless terminal 200 (step 430).

The altitude detection unit 180 determines a relative altitude by combining an optical device and the tilt detection unit 170. For example, the infrared communication device 112 of FIG. 2 is used for the altitude detection unit 180 to determine a relative altitude. If the slope α 1 of the first wireless terminal 100 is greater than 90 degrees, a slope α 2 of the second wireless terminal 200 is less than 90 degrees and the infrared communication device 112 of the first wireless terminal 100 detects a signal from the infrared communication device 212 of the second wireless terminal 200, the first wireless terminal 100 is determined to be located at a higher altitude than the second wireless terminal 200 as shown in FIG. 2.

Detection information of the altitude detection unit 180 is transmitted to the control unit 130. If a transmission start condition is satisfied at step 310 according to the detection information, the control unit 130 controls the communication unit 110 to start transmission of a data packet (step 320). If a transmission start condition is not satisfied at step 310, the control unit 130 controls the detection unit 150 to repeat step 310.

That is, if the altitude detection unit 180 determines that the altitude of the first wireless terminal 100 is higher than that of the second wireless terminal 200, the process of step 430 proceeds to step 320 for the communication unit 110 to start transmission of a data packet. As shown in FIG.2, this is the case in which the user manipulates the first wireless terminal 100 in a similar manner to pouring a liquid. If the altitude detection unit 180 determines that the altitude of the first wireless terminal 100 is not higher than that of the second wireless terminal 200, the process of step 430 returns to step 310 to repeat the process of determining whether a transmission start condition is satisfied.

The example of FIG. 4B shows that step 430 is added to the FIG. 4A embodiment. In any case, in an example of operating according to FIG. 4A, or to FIG. 4B, transmission of a packet is started according to the user's manipulation in a similar manner to pouring a liquid, as shown in FIG. 2.

Figure 4C:
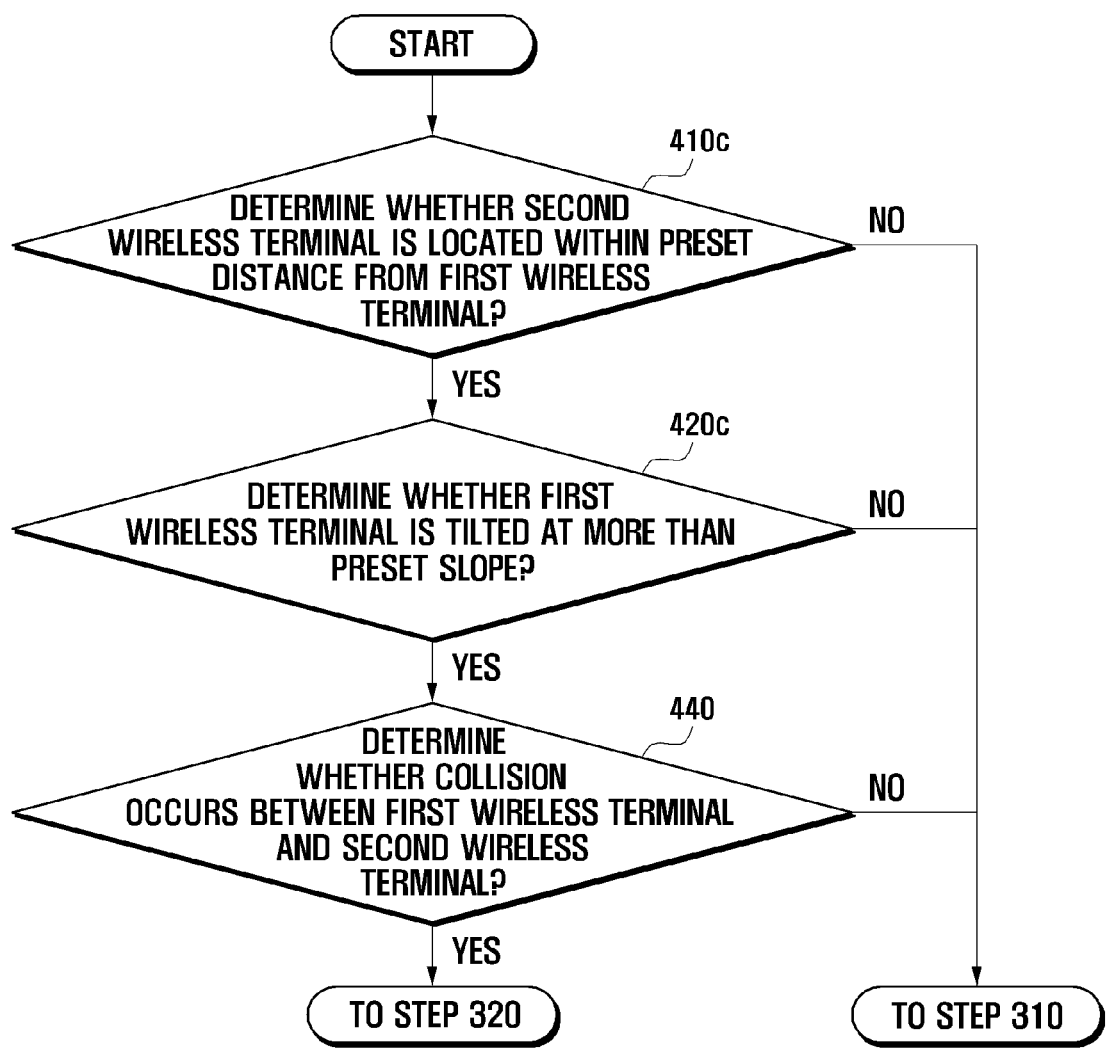
FIG. 4C is a detailed flow chart illustrating a step of determining whether a transmission start condition is satisfied in the method of FIG. 3.

FIG. 4C is a detailed flow chart illustrating step 310 of FIG. 3 in a case in which the detection unit 150 includes the approach detection unit 160, the tilt detection unit 170 and the collision detection unit 190. In the FIG. 4C flow chart, however, the detection unit 150 does not include the altitude detection unit 180, or does not utilize the altitude detection unit 180 if included in the detection unit 150.

Steps 410*c* and 420*c* of FIG. 4C correspond to steps 410*a* and 420*a* of FIG. 4A, respectively. In FIG. 4C, if the first wireless terminal 100 determines that the second wireless terminal 200 is located within a preset distance from the first wireless terminal 100 (step 410*c*) and the first wireless terminal 100 is tilted at more than a preset slope (step 420*c*), the process of step 420*c* proceeds to step 440, instead of proceeding to step 320 to start transmission of a packet as in FIG. 4A.

The collision detection unit 190 determines whether the first wireless terminal 100 collides with the second wireless terminal 200 (step 440).

If the collision detection unit 190 detects collision between the first wireless terminal 100 and second wireless terminal 200, the process of step 440 proceeds to step 320 to start transmission of a data packet.

If the collision detection unit 190 does not detect collision between the first wireless terminal 100 and second wireless terminal 200, the process of step 440 returns to step 310 to repeat the process of determining whether a transmission start condition is satisfied.

Collision is detected by an acceleration sensor or pressure sensor. When an acceleration sensor is used, collision is determined to occur if an instantaneous acceleration (changed amount of speed) is greater than a preset acceleration value, because a rapid speed change generally occurs if there is collision. When a pressure sensor is installed on a surface of the first wireless terminal 100, collision is determined to occur if the sensor detects a pressure above a preset pressure value. Collision also may be detected by other methods. For example, the first wireless terminal 100 and second wireless terminal 200, or portions thereof, may be made of a conductive material, and, when a part made of the conductive material is contacted, a minute current signal is exchanged and collision is identified thereby.

Returning to FIG. 3, the communication unit 110 transmits a preset packet to the second wireless terminal 200 in step 320. The communication unit 110 may include any wireless communication module. The wireless communication module is embodied using, for example, at least one of a Bluetooth module 111, WI-FI module, infrared communication device 112 (IrDA), TransferJet module or any other module that communicates wirelessly.

As described above, the control unit 130 receives information about satisfaction of a transmission start condition (refer to FIGS. 4A to 4C) from the detection unit 150, and controls the communication unit 110 to transmit the preset data packet to the second wireless terminal 200 if the transmission start condition is satisfied.

The preset packet is a data packet corresponding to, for example, a preset content. The communication unit 110 packetizes a preset content and transmits the packet to the second wireless terminal 200. The preset content is content set by the user or a terminal manufacturer. The preset content is, for example, an address list file. In this case, when satisfaction of a transmission start condition is identified at step 310, the communication unit 110 packetizes and transmits the address list file.

Figure 6A:
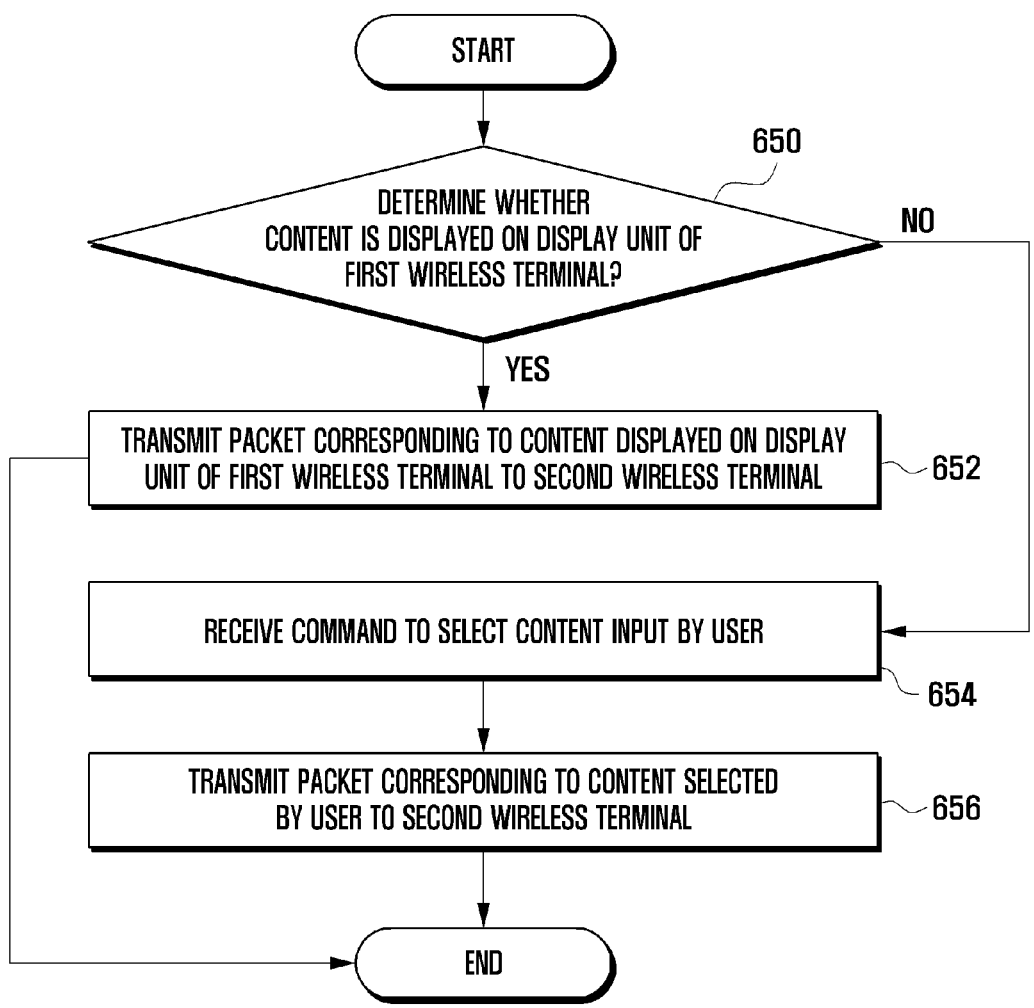
FIG. 6A is a detailed flow chart illustrating a step of transmitting a preset packet in the method of FIG. 3.

FIG. 6A is a detailed flow chart illustrating step 320 according to an alternative embodiment, wherein the control unit 130 determines whether content is displayed on the display unit 140 of the first wireless terminal 100 (step 650). If content is displayed on the display unit 140 of the first wireless terminal 100, a packet corresponding to the content displayed on the display unit 140 is transmitted to the second wireless terminal 200 (step 652).

The preset packet of step 320 is a packet corresponding to content displayed on the display unit 140 of the first wireless terminal 100 when the detection unit 150 determines that a packet transmission start condition is satisfied.

FIGS. 7A-7D illustrate various embodiments of screens displayed on the display unit 140 of the first wireless terminal 100 when the detection unit 150 determines that a packet transmission start condition is satisfied. That is, contents are displayed on the display units 140 of wireless terminals 610, 620, 630 and 640 depicted in FIGS. 7A. 7B. 7C and 7D, respectively.

Wireless terminal 610 (FIG.7A) displays a screen of music replaying on the display unit 140. If the detection unit 150 determines that a packet transmission start condition is satisfied while the screen shown in terminal 610 is displayed, the communication unit 110 packetizes a music file displayed as replaying on the screen (or temporarily stopped) and transmit the packet to the second wireless terminal 200. If a replay list is displayed, the communication unit 110 packetizes a music file displayed on the replay list and transmits the packet to the second wireless terminal 200. Other media files such as a moving picture file as well as the music file are transmitted by the same method.

Wireless terminal 620 (FIG. 7B) displays a screen of photo files on the display unit 140. If the detection unit 150 determines that a packet transmission start condition is satisfied while the screen shown in terminal 620 is displayed, the communication unit 110 packetizes a photo file displayed on the screen and transmits the packet to the second wireless terminal 200.

Wireless terminal 630 (FIG. 7C) displays a screen of address information on the display unit 140. If the detection unit 150 determines that a packet transmission start condition is satisfied while the screen shown in terminal 630 is displayed, the communication unit 110 packetizes an address list file displayed on the screen and transmits the packet to the second wireless terminal 200.

Wireless terminal 640 displays a screen of file list information on the display unit 140. If the detection unit 150 determines that a packet transmission start condition is satisfied while the screen shown in terminal 640 (FIG. 7D) is displayed, the communication unit 110 packetizes a file included in the list (or a selected file) displayed on the screen and transmit the packet to the second wireless terminal 200.

Returning to FIG. 6A, if content is not displayed on the display unit 140 of the first wireless terminal 100 at step 650, the first wireless terminal 100 receives a command to select content by input of a user (step 654). Step 654 is executed if a packet transmission start condition is satisfied while the display unit 140 does not display content. For example, if a packet transmission start condition is satisfied while displaying a basic screen, a default screen or a screen of menu selection, step 654 is executed.

The input unit 120 receives input to select content from the user in step 654. The user selects content to be transmitted by input through a touchpad or keypad. The first wireless terminal 100 transmits a packet corresponding to the selected content to the second wireless terminal 200 (step 656). The control unit 130 controls the communication unit 110 to transmit the packet corresponding to content (address list file, music file, etc) selected in step 654 to the second wireless terminal 200. The second wireless terminal 200 copies content of the transmitted packet, or receives other information.

Figure 6B:
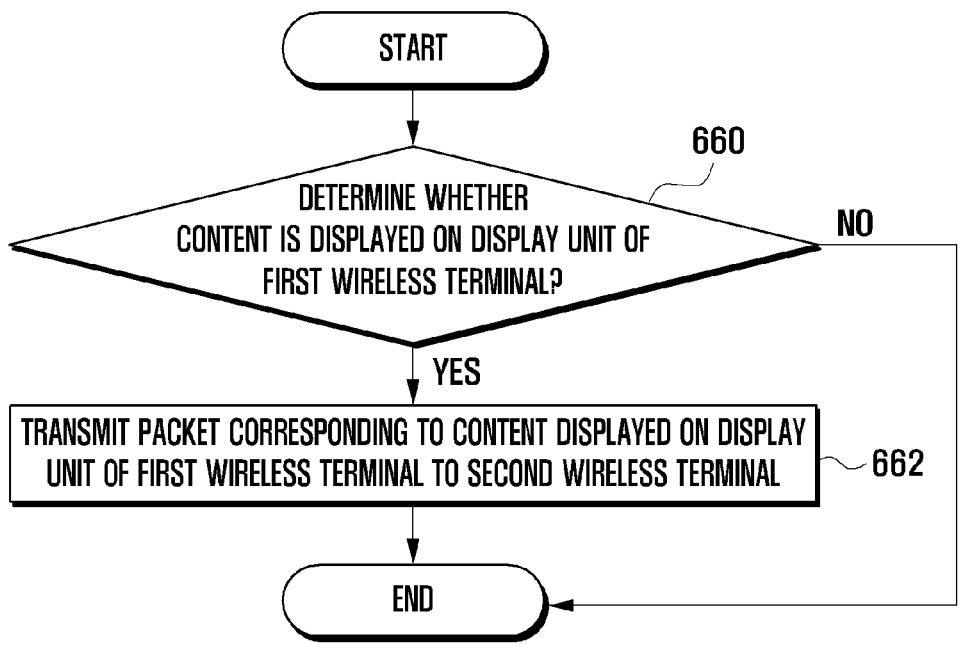
FIG. 6B is a detailed flow chart illustrating a step of transmitting a preset packet in the method of FIG. 3.

FIG. 6B is a detailed flow chart illustrating step 320 according to another exemplary embodiment of the present invention;

In the embodiment illustrated in FIG. 6B, if content is displayed on the display unit 140 of the first wireless terminal 100, a data packet corresponding to the content displayed on the display unit 140 of the first wireless terminal 100 is transmitted to the second wireless terminal 200. Packet transmission is not executed in other cases.

Referring to FIG. 6B, the control unit 130 determines whether content is displayed on the display unit 140 of the first wireless terminal 100 (660). The process of determining whether content is displayed was previously described in detail referring to FIGS. 6A and 7, and detailed description thereof is omitted here.

If content is displayed on the display unit 140 of the first wireless terminal 100, the first wireless terminal 100 transmits a packet corresponding to the content displayed to the second wireless terminal 200 (662). The packet corresponding to content displayed on the display unit 140 of the first wireless terminal 100 was previously described in detail referring to FIGS. 6A and 7.

Figure 6C:
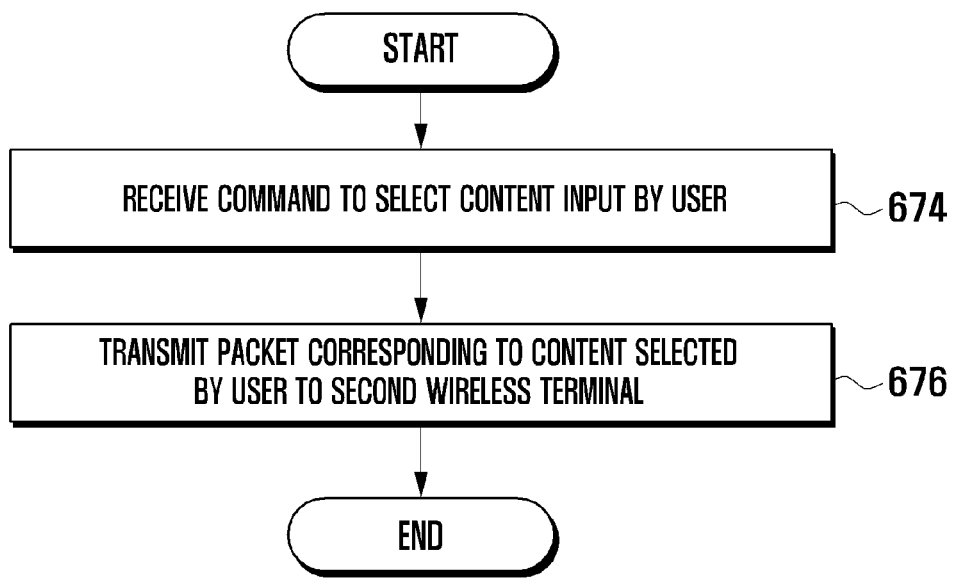
FIG. 6C is a detailed flow chart illustrating a step of transmitting a preset packet in the method of FIG. 3.

FIG. 6C is a detailed flow chart illustrating an embodiment of step 320, wherein the first wireless terminal 100 receives a command to select content from the user and transmits a packet corresponding to the content to the second wireless terminal 200, regardless of content displayed on the display unit 140.

The input unit 120 of the first wireless terminal 100 receives a command to select content by input of the user (674), and the user selects content to be transmitted by input through the touchpad or keypad.

The control unit 130 controls the communication unit 110 to transmit a packet corresponding to the content selected by the user through the input unit 120 to the second wireless terminal 200 (676). The communication unit 110 transmits the packet corresponding to the content selected by the user to the second wireless terminal 200 according to control of the control unit 130.

Returning to FIG. 3, the display unit 140 displays a progress state of transmission of a packet (330). As an amount of transmitted packet data increases, the display unit 140 displays the progress state of transmission of the packet data by reducing an amount of a material in a displayed image of the material.

Figure 8A:
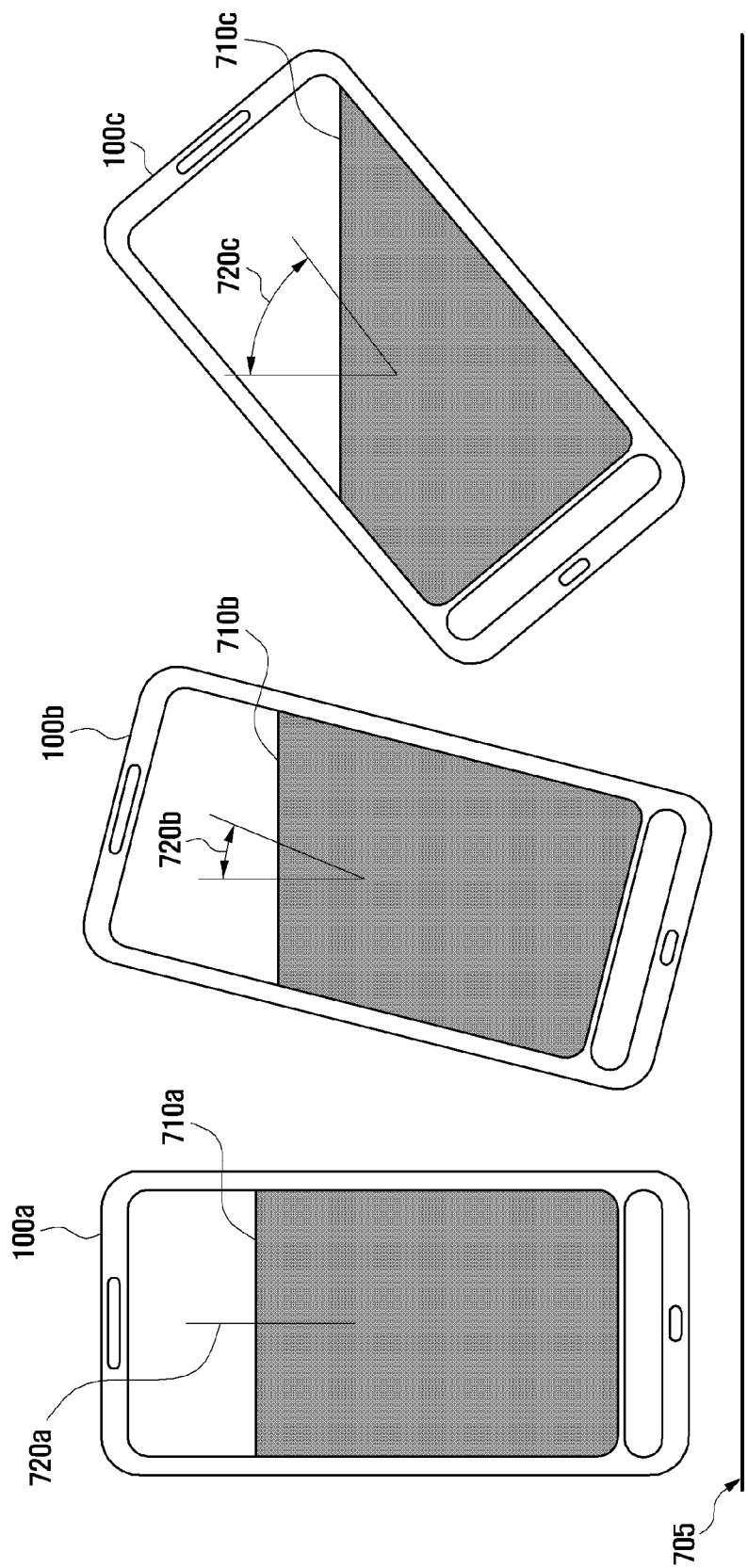
FIG. 8A, FIG. 8B and FIG. 8C illustrate various examples of displaying progress states of transmission of a packet according to the invention.
Figure 8B:
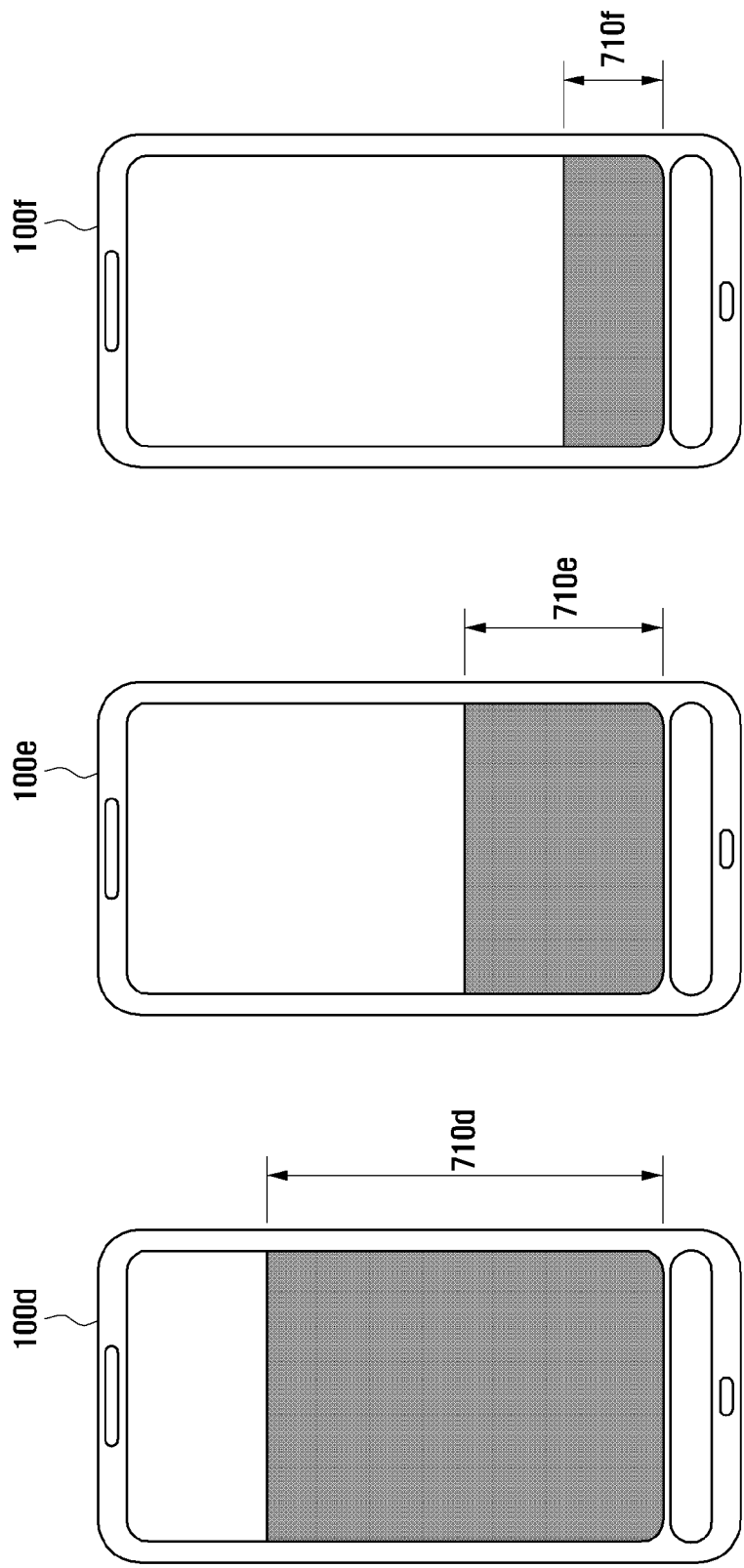
Figure 8C:
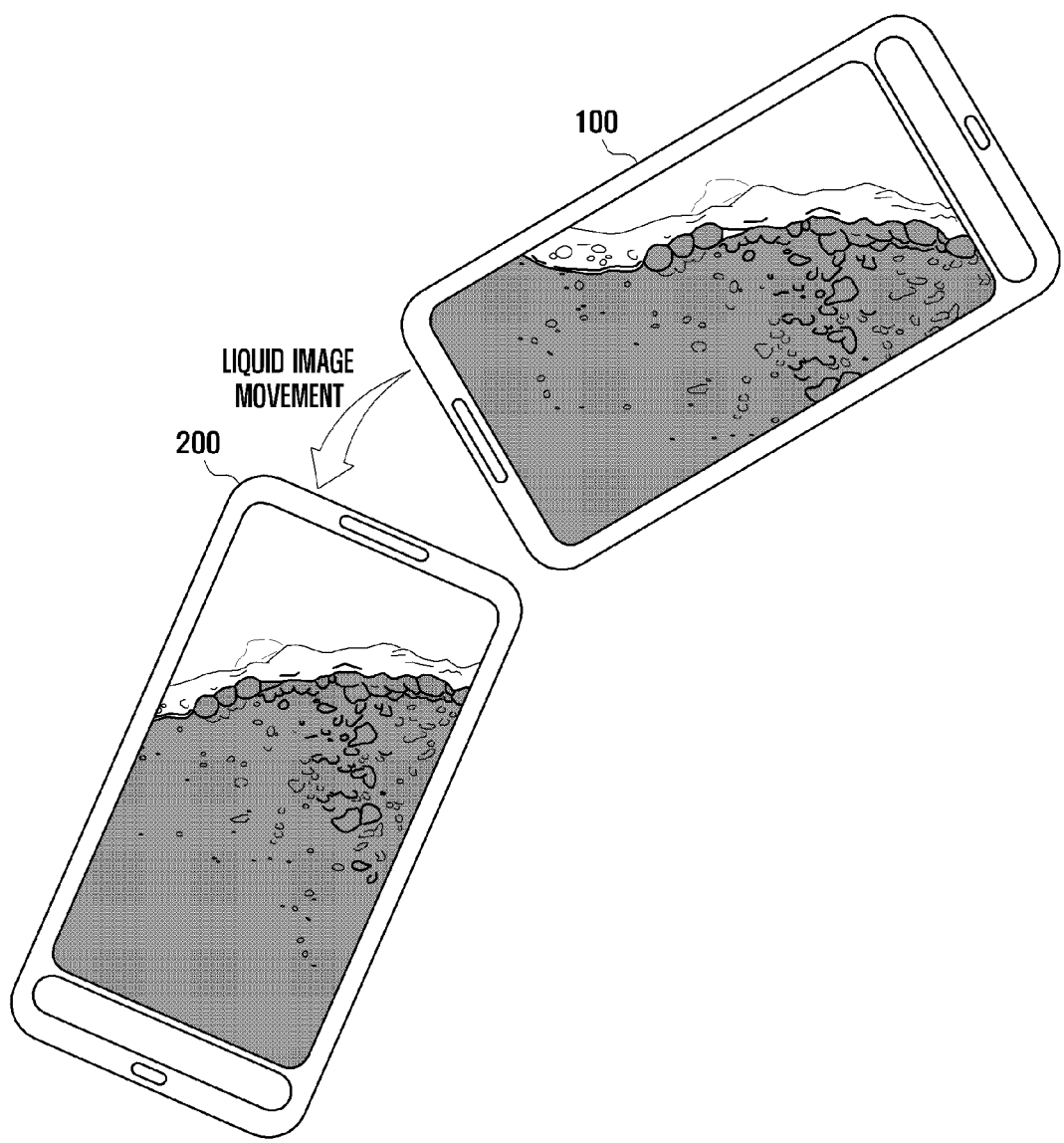

FIGS. 8A to 8C together illustrate progress states over time (from left to right) during a transmission of a data packet or packets from a first wireless terminal 100 according to the invention. Referring to FIG. 8A, the first wireless terminal 100 displays a liquid material image. When the first wireless terminal 100 is tilted as in FIG. 8A, the upper surface of the liquid material image changes to remain parallel to a ground surface 705.

In a first example 100*a* of FIG. 8A, the first wireless terminal 100 is placed vertical to the ground surface (as shown) so that a tilt angle 720*a* of the first wireless terminal 100 is 0 degrees. In a second example 100*b* of FIG. 8A, the first wireless terminal 100 is tilted at a first tilt angle 720*b*. In a third example 100*c* of FIG. 8A, the first wireless terminal 100 is tilted at a second tilt angle 720*c*. In each of the three examples shown (i.e., 100*a*, 100*b* and 100*c* ) therefore, each of the upper surfaces 710*a*, 710*b* and 710*c* of the liquid material image displayed in the first wireless terminal 100 is displayed tilted at the corresponding tilt angle relative to the vertical axis of the first wireless terminal 100. A tilt angle of the first wireless terminal 100 is measured by a tilt sensor included in the tilt detection unit 170.

The upper surface 710*a* of the liquid material image of the first example 100*a*, the upper surface 710*b* of the liquid material image of the second example 100 *b*, and the upper surface 710*c* of the liquid material image of the third example 100*c* are each displayed parallel to the ground surface 705. The above image change provides the user with an illusion that there is liquid or powder in the first wireless terminal 100.

Although the upper surfaces of the liquid material images are displayed parallel to the ground surface 705 in the FIG. 8A examples, uneven upper surfaces of material images representing powder or small granules are displayed that appears to be carried in the first wireless terminal 100. Additionally, effects of waves or foam on the upper surfaces of the liquid material images are displayed, as shown in FIG. 8C.

FIG. 8B shows changes in the height of a liquid image displayed in the first wireless terminal 100 according to progress during a transmission of a packet data. A first example 100*d* of FIG. 8B shows an image before the first wireless terminal 100 starts transmission of a packet to the second wireless terminal 200, a second example 100*e* shows an image after transmission of the packet data starts, and a third example 100*f* shows an image after transmission of the packet data has progressed. The heights of the liquid material images decrease gradually from the height 710*d* to heights 710*e* and 710*f* as transmission of the packet progresses. As transmission of the packet from the first wireless terminal 100 progresses and the second wireless terminal 200 receives an increasing amount of the packet data, the height of the liquid image increases in the second wireless terminal 200, in relation to its decrease in the first wireless terminal 100.

That is, as transmission of the packet data from the first wireless terminal 100 progresses, the height of the liquid image displayed in the first wireless terminal 100 decreases. Conversely, the height of the liquid image displayed in the second wireless terminal 200 increases. In a similar manner to pouring a liquid from a container into another container, the display provides an impression that a liquid image of the first wireless terminal 100 is moved to the second wireless terminal 200.

The liquid image is displayed having its maximum height when the entire storage capacity of a storage unit is used in a wireless terminal, and the height of the displayed liquid image is proportional to the used amount of the storage unit in the wireless terminal.

Returning to FIG. 3, the first wireless terminal 100 determines whether a transmission termination condition is satisfied (340). The transmission termination condition is satisfied when a preset packet to be transmitted is completely transmitted, if the user inputs a transmission termination command through the input unit of the first wireless terminal 100 or second wireless terminal 200, and if the user separates the first wireless terminal 100 and second wireless terminal 200 such that a communication signal weakens to such a degree that difficulty is caused in maintaining communication.

Further, the transmission termination condition to terminate transmission of a packet is satisfied when any one of the transmission start conditions in step 310 ceases to be satisfied after initiation of transmission of a packet. For example, the transmission start conditions will cease being satisfied when the distance between the two wireless terminals 100 and 200 increase to be greater than a preset distance, when a slope of the first wireless terminal 100 becomes less than a preset slope, or when the altitude of the first wireless terminal becomes equal to or lower than that of the second wireless terminal 200. Transmission of a packet (content) is thereby terminated when the user stops operation in a similar manner to stopping pouring a liquid.

In an alternative embodiment, however, transmission of a packet is maintained if communication can be maintained even when any one of the transmission start conditions of step 310 ceases to be satisfied after starting transmission of a packet. Because transmission of content may take a relatively long time to complete (for example, several minutes) depending on a wireless communication method, it may be inconvenient for the user to maintain operation in a similar manner to pouring a liquid.

When the first wireless terminal 100 determines that a transmission termination condition is satisfied, the first wireless terminal 100 returns to a state existing prior to transmission of the packet and displays a screen that was displayed before starting transmission. The first wireless terminal 100 displays a screen notifying completion of transmission of the packet to the user.

A wireless terminal according to the invention is a portable electronic device such as a mobile phone, personal digital assistant, navigation device, digital broadcast receiver, and portable multimedia player. Such wireless terminal may comprise a folder type, bar type, flip type, sliding type, rotating type or combination type thereof, without limitation.

The wireless terminal of the invention enables a user to conveniently copy and move content between wireless terminals and control other operations. The wireless terminal of the invention enables the user to intuitively copy and move content between wireless terminals and control other operations.

By using a wireless terminal of the invention, the user may experience an enjoyable feeling in copying and moving content between wireless terminals and controlling other operations.

Note that the above-described methods according to the present invention can be realized in hardware or via the execution of software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A method comprising:
   receiving an input at a first device;
   transmitting data from the first device to a second device in response to the input; and
   presenting a representation corresponding to the data via the first device, the presenting including displaying at least one property of the representation as changed based at least in part on a progress of the transmitting of the data,
   wherein as a tilting of the first device is initiated for transmission of data, displaying a decreasing amount of the at least one property of the representation on a first portion of a display of the first device, and displaying an increasing amount of the at least one property of the representation on a second portion of the display of the first device, the second portion is opposite the first portion.

2. The method of claim 1, wherein the at least one property comprises:
   at least one of an amount, a volume, a speed, a size, a height, a tilt angle, a surface level, or a combination thereof.

3. The method of claim 1, wherein the representation comprises:
   at least one of a liquid image, a powder image, a granule image, a material image, or a combination thereof.

4. The method of claim 1, wherein the presenting comprises:
   displaying at least one image of moving the representation from the first device to the second device.

5. The method of claim 1, wherein the presenting comprises:
   displaying another representation in relation with the representation via the second device.

6. The method of claim 1, wherein the receiving comprises:
   detecting a motion of at least one of the first device or the second device; and
   identifying the motion as the input.

7. The method of claim 1, wherein the receiving comprises:
   detecting a tilt angle of at least one of the first device or the second device; and
   identifying the tilt angle as the input based on determining that the tilt angle exceeds a specified value.

8. The method of claim 1, further comprising:
   identifying, at the first device, the second device prior to receiving the input.

9. The method of claim 8, wherein the identifying comprises:
   determining whether a distance between the first device and the second device falls within a specified range.

10. The method of claim 1, wherein the transmitting comprises:
    transmitting content displayed via the first device, as the data.

11. The method of claim 1, wherein the transmitting comprises:
    transmitting content selected by a user, as the data.

12. The method of claim 1, wherein the transmitting comprises:
    comparing a first altitude of the first device with a second altitude of the second device; and
    initiating the transmitting of the data based at least in part on a result of the comparing.

13. The method of claim 1, wherein the transmitting comprises:
    detecting a physical collision or contact between the first device and the second device; and
    initiating the transmitting of the data in response to the physical collision or contact.

14. An apparatus comprising:
    a processor-implemented controller to execute a data transfer module, the data transfer module configured to:
    receive an input;
    transmit data to an device external to the apparatus in response to the input; and
    present a representation corresponding to the data being transmitted via a display operatively coupled to the apparatus, the presentation of the representation including displaying at least one property of the representation as changed based at least in part on a progress of the transmission of the data,
    wherein as a tilting of the apparatus is initiated for transmission of data, displaying a decreasing amount of the at least one property of the representation on a first portion of a display of the apparatus, and displaying an increasing amount of the at least one property of the representation on a second portion of the display of the apparatus, the second portion is opposite the first portion.

15. The apparatus of claim 14, wherein the data transfer module is configured to:
    present, via the display, at least one image of moving the representation from the apparatus to the device.

16. The apparatus of claim 14, wherein the data transfer module is configured to:
    detect a motion of at least one of the apparatus or the device via at least one sensor operatively coupled to the apparatus; and
    identify the motion as the input.

17. The apparatus of claim 14, wherein the at least one module is configured to:
    detect at least one physical feature of the apparatus or the device, as the input, via at least one sensor.

18. The apparatus of claim 17, wherein the at least one physical feature comprises:
    at least one of a tilt angle, a collision, a contact, a pressure, an altitude, or a proximity.

19. The apparatus of claim 14, wherein the data transfer module is configured to:
    identify the device based at least in part on a distance between the apparatus and the device.

20. A computer-readable non-transitory storage medium storing instructions that, when executed by one or more processors, cause the one or more processors to perform operations comprising:
    receiving an input at a first device;
    transmitting data from the first device to a second device in response to the input; and
    presenting a representation corresponding to the data via the first device, the presenting including displaying at least one property of the representation as changed based at least in part on a progress of the transmitting of the data, wherein as a tilting of the first device is initiated for transmission of data, displaying a decreasing amount of the at least one property of the representation on a first portion of a display of the first device, and displaying an increasing amount of the at least one property of the representation on a second portion of the display of the first device, the second portion is opposite the first portion.

* * * * *